United States Patent [19]

Turner et al.

[11] Patent Number: 4,562,425

[45] Date of Patent: Dec. 31, 1985

[54] DIFFERENTIAL ENCODER AND DECODER FOR TRANSMITTING BINARY DATA

[75] Inventors: Laurence F. Turner, Bishop's Stortford; John W. Bailey, Keston, both of United Kingdom; Henry H. Parrish, Miami Springs, Fla.

[73] Assignee: Racal-Milgo Limited, Berkshire, England

[21] Appl. No.: 459,504

[22] Filed: Jan. 20, 1983

[30] Foreign Application Priority Data

Feb. 2, 1982 [GB] United Kingdom ................. 8202919

[51] Int. Cl.[4] ........................ H03K 13/24; H03K 7/10
[52] U.S. Cl. ............................. 340/347 DD; 332/9 R; 375/27
[58] Field of Search .................. 340/347 DD; 375/25, 375/27, 31, 32, 40–42, 52, 53, 56, 57, 67; 332/9 R, 10, 11 R, 16, 17, 21, 22

[56] References Cited

U.S. PATENT DOCUMENTS

| | | | |
|---|---|---|---|
| 3,588,349 | 6/1971 | Kawai et al. | 375/42 |
| 3,805,191 | 4/1974 | Kawai et al. | 375/42 X |
| 3,983,485 | 9/1976 | Stuart | 375/42 |
| 4,024,342 | 5/1977 | Croisier et al. | 178/67 |
| 4,077,021 | 2/1978 | Csajka et al. | 332/9 R |
| 4,271,527 | 6/1981 | Armstrong | 375/39 |
| 4,495,477 | 1/1985 | Weber | 332/10 |

FOREIGN PATENT DOCUMENTS 0062435 10/1982 European Pat. Off.

OTHER PUBLICATIONS

IRE Transactions on Communications Systems, Mar. 1962, p. 84.
IEEE Transactions on Communications, vol. COM 21, No. 10, Oct. 1973, pp. 1108 to 1115.
IEEE Transactions on Communications, vol. COM-26, Mar., 1978, W. J. Weber, "Differential Encoding for Multiple Amplitude and Phase Shift Keying Systems", pp. 385–391.
CCITT–The International Telegraph and Telephone Consultative Committee, Yellow Book, vol. VIII, Fascicle VIII.1, "Data Communication over the Telephone Network", Recommendations of the V Series, Vth Plenary Assembly, Geneva, Nov. 10–21, 1980, Geneva, 1981, Recommendation V.29, 9600 Bits Per Second Modem Standardised for Use on Point-to-Point 4-Wire Leased Telephone-Type Circuits, pp. 165–177.

Primary Examiner—Vit W. Miska
Attorney, Agent, or Firm—Jerry A. Miller; William A. Newton

[57] ABSTRACT

To enable binary data to be differentially encoded into symbols (waves) for transmission the data is applied in n-bit data-words to produce symbols which, when displayed in a phasor-diagram, are in three groups in three 120°-phase-sectors respectively, the number and dispositions of the symbols in the three sectors being the same. The encoding is such that, depending upon the data-word to be transmitted the sector in which a symbol is produced is rotated by 0°, 120° or 240° relative to the next preceding sector containing a symbol. In some embodiments one of the $2^n$ possible different data-words is applied to produce an absolute symbol of zero amplitude. At a receiver the received symbols are decoded having regard to the 0°, 120° and 240° differential sector-rotations.

16 Claims, 19 Drawing Figures

DIFFERENTIAL ENCODER AND DECODER FOR TRANSMITTING BINARY DATA

BACKGROUND OF THE INVENTION

The present invention relates to the transmission of binary data and is concerned particularly but not exclusively with the transmission of binary data through telephone-channels.

The practice of transmitting binary data through telephone-channels has grown substantially over the past 15 years and with developments in technology it has been possible to increase the data bit-rate (a bit is a binary digit) from about 200 bits per second (BPS) to some thousands per second despite the fact that the bandwidth of telephone-channels is only from about 500 Hz to about 3000 Hz and despite the presence of noise and other disturbances in telephone-channels which affect the signals.

The technology which has made possible this large increase in bit-rate includes within it the concept of encoding groups of bits into symbols for transmission and, at a receiver, decoding the symbols into the original groups. Hereinafter such groups are referred to as "data-words".

For example if the binary data is handled in 4-bit data-words there are 16 possible different such words ranging from 0000 to 1111 and 16 different symbols are used to represent these 16 different data-words respectively. The symbols are transmitted at a rate—known as the baud-rate—which lies within the bandwidth of the telephone-channels. With a baud-rate of 2,400 and 4-bit data-words the bit-rate is 9,600 BPS.

The symbols used to represent the data-words are waves distinguished from one another in dependence upon their phases or in dependence upon both their amplitudes and their phases.

Examples of the prior art can conveniently be described with the aid of phasor-diagrams. Examples are shown in FIGS. 1 to 4 of the accompanying drawings in which only the tips of the phasors are indicated by dots. This manner of representation has been common practice for some years—see for example IRE Transactions on Communications Systems March 1962 page 84, FIG. 4.

Referring to FIG. 1 this relates to the case in which the data is handled in 2-bit data-words. Thus four different symbols are required and these are shown at 10, 11, 12 and 13 respectively. They are equally spaced from the origin and, with reference to a phase of 0° shown as the x-axis, are at phase-angles of 45°, 135°, 225° and 315°. The allocation of the symbols to different 2-bit data-words is a matter of choice in the encoding process.

At a co-operating receiver reference waves of 0°—phase (x-axis) and 90°—phase (y-axis) are generated and each received symbol is resolved into its x and y components by synchronous demodulators fed with the 0° and 90° reference waves respectively. A decision-making logic-network is fed with the x and y components and from these it decides which of the four symbols is received. The decision-making logic network in effect divides the signal-space shown in FIG. 1 into four decision-regions each of which is a quadrant i.e. the boundaries of the decision-regions are the intersecting x and y axes. Disturbances such as noise in the transmission channel can affect both the amplitude and the phase of a received symbol but provided a symbol is not moved out of its associated decision-region by disturbances in transmission the decision-making logic-network recovers the symbol correctly. In this way considerable tolerance to disturbances is achieved.

However, there are particular disturbances which can cause every symbol to be moved out of its related decision region in the receiver whereby gross and continuing errors occur in the decoded data.

For example, a phenomenon known as a phase-hit can occur in the transmission channel. This takes the form of large, sudden, persistent and equal changes of the phases of all symbols which can, for example, cause the y-component of each symbol to be resolved as the x-component and the negative of the x-component as the x-component at the receiver. With the receiver locked in this condition all symbols are incorrectly recovered.

To enable this problem to be substantially eliminated a technique known as differential-phase encoding was developed and has been extensively practised in systems in which the symbols are all of the same amplitude but of different phases, for example, as shown in FIG. 1. In such differential-phase encoding each data-word is not represented by a symbol per se but by a rotation or change of phase from the next-preceding symbol. At a receiver the data-words are recovered by measuring this rotation of phase and the measured rotation is decoded into the transmitted data-word. If in such a system a phase-hit should occur as previously described there are immediate errors but thereafter correct data is recovered.

FIG. 2 is a phasor-diagram applicable to the encoding of 3-bit data-words into 8 symbols. In this the symbols are again all of the same amplitude but are of 8 different phases each individual to a different one of the 8 possible different 3-bit data-words. The boundaries of the related 8 decision-regions in the decision-making logic-network at the receiver are shown in broken lines. It will be appreciated from FIG. 2 that for a given transmitted power such a system is less tolerant to disturbances of the symbols during transmission than the system described with reference to FIG. 1. Again it is usual to practise differential-phase encoding and decoding of the symbols of FIG. 2.

Referring now to FIG. 3, this relates to a technique for encoding 4-bit data-words into 16 symbols for transmission which is the subject of C.C.I.T.T. Recommendation V29.

The symbols in FIG. 3 are distinguished from one another in dependence upon both amplitude and phase and with the amplitudes and phases interrelated. Because of this, differential-phase encoding and decoding as previously described cannot be applied, However a modified form of differential encoding is employed as set out in C.C.I.T.T. Recommendation V29 which enables phase-hits to be handled in some measure.

Typical decision regions are shown by broken lines in FIG. 3 and it will be seen that for a given transmitted power there is a further reduction in the tolerance to disturbances in the transmission channel.

Users are continually seeking facilities for enabling the bit-rate to be increased and the possibility of devising apparatus for transmitting data at bit-rates of 12,000 BPS, 14,400 BPS and 16,000 BPS is currently being explored. At 12,000 BPS there are 32 symbols representing 5-bit data-words and at 14,400 BPS there are 64 symbols representing 6-bit data-words given a baud-rate of 2,400.

The performance of a transmission system using a telephone-channel is measured primarily by its tolerance to Gaussian noise in the channel. Assessments of the performance of different systems in the presence of Gaussian noise in telephone channels are to be found in the literature on the subject.

It is a general rule that for a given transmitted power the tolerance to Gaussian noise decreases sharply as the number of symbols used is multiplied. This comes about from the fact that as the number of symbols is increased they have to be more closely packed if a given transmitted power is not to be exceeded (compare FIGS. 2 and 1) and hence the decision-regions associated with the different symbols at the receiver become smaller whereby less noise-power is needed to move a symbol out of its associated decision region. It is usual to express this tolerance in terms of what is called the minimum required signal-to-noise ratio (SNR). In arriving at this minimum required SNR the minimum distance between symbols i.e., for example, the minimum distance between the dots in FIG. 3, is normalised to 2 and the minimum required SNR is given by:

$$10 \log_{10}\left[\frac{R_1^2 + R_2^2 + \ldots + R_n^2}{n}\right] \text{ decibels (dB)}$$

where $R_1, R_2 \ldots R_n$ are the amplitudes of the n symbols used. Applying this to FIG. 1 the amplitudes are equal and the normalising makes them equal to $\sqrt{2}$. Thus the minimum SNR required is $$10 \log_{10} \frac{8}{4} \text{ dB.}$$

$$= 3 \text{dB.}$$

For FIG. 2, the minimum SNR required = 8.3 dB.
For FIG. 3, the minimum SNR required = 11.3 dB.

It is another general rule that for any given number of symbols and a given limit of transmitted power the tolerance to Gaussian noise improves as the symbols are spread more evenly throughout the phasor-diagram.

With this in mind it has been considered for some years that an arrangement in which all symbols are equidistant from their neighbours is superior to any other known form. In relation to a system operating at a baud-rate of 2400 and a bit-rate of 14,400 BPS the symbols for such a system would be as shown in FIG. 4—see also IEEE Transactions on Communications, Vol. COM 21, No. 10, October 1973, pages 1108 to 1115.

Although this general form has been known for some years and has been described and discussed on the assumption of a perfectly synchronised receiver it could not, in general, be put into use because no technique for enabling differential encoding and decoding to be practised with it has been devised. The invention to be described hereinafter enables this problem to be solved.

SUMMARY OF THE INVENTION

The present invention is directed toward an apparatus for encoding binary data into symbols for transmission comprising first means for marshalling the data into n-bit data-words where n is plural, and second means coupled to the first means and responsive to at least $(2^n-1)$ different ones of the possible $2^n$ different data-words therefrom to produce symbols arranged in three like groups in three 120°-phase-sectors respectively, the sector in which a symbol is produced being rotated by 0°, 120° or 240° relative to the next-preceding sector in which a symbol was produced depending upon which of the said at least $(2^n-1)$ data-words is to be transmitted.

BRIEF DESCRIPTION OF THE DRAWINGS

The invention will now be described by way of example with reference to the appended Tables 1 to 4 and to FIGS. 5 to 17 of the accompanying drawings in which FIG. 17 shows a modification to the bit allocation of the data-words related to the symbols in Sector 1 of FIG. 11.

DETAILED DESCRIPTION OF THE PREFERRED EMBODIMENTS

The present invention is based upon the realisation that differential encoding and decoding can be applied between three groups of symbols in accordance with a 3-phase approach and with satisfactory results.

In applying this concept the centre point—i.e. a wave of zero amplitude—can be used but does not enter into the differential-encoding.

With n-bit data-words (n being plural) the number of different possible data-words is $2^n$. Thus if one data-word is applied to produce the zero-amplitude symbol the remaining $(2^n-1)$ data-words are applied to produce symbols arranged in three like groups in three 120°-phase-sectors respectively with differential encoding between sectors. If n is even the number of symbols in each sector is $(2^n-1)/3$. For example, if n=6 there are 64 symbols and with one symbol of zero amplitude the remaining 63 symbols are differentially encoded between three groups of 21 symbols each. If a symbol of zero amplitude is not used although there are only 64 possible different data-words the differential encoding produces 66 symbols differentially encoded between three groups of 22 symbols each as described later.

If n is odd and one data-word is applied to produce a symbol of zero amplitude, the remaining $(2^n-1)$ data-words are applied to produce $(2^n+1)$ symbols differentially encoded between three groups of $(2^n+1)/3$ each. For example if $n=5$, $(2^n+1)=33$ and there are three groups of 11 symbols each between which the differential encoding occurs. If a symbol of zero amplitude is not used the number of symbols arranged in the three groups remains at 33 with 11 symbols in each.

It will be appreciated that the term "symbols" in relation to the invention includes within its meaning the special case of a wave of zero amplitude and that every other symbol is a wave of an amplitude and a phase individual to the symbol.

Herein and in the appended claims when it is said that symbols are arranged in three like groups in three 120°-phase-sectors respectively, it is meant that when the symbols are displayed in a phasor-diagram they can be sub-divided into three groups lying in three 120°-phase-sectors respectively, the numbers of symbols in the three groups being the same and the dispositions of the symbols in the three groups being such that if any sector is rotated by 120° into coincidence with an adjacent sector, the symbols in the coincident sectors also coincide.

Figure 1:
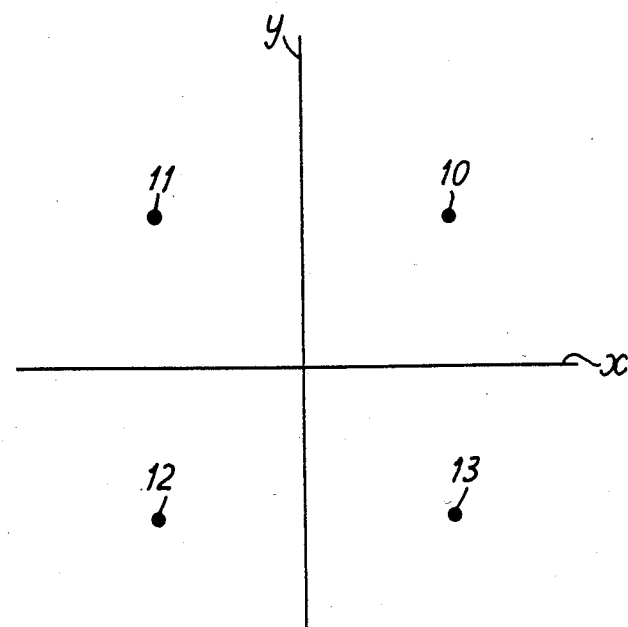
Figure 2:
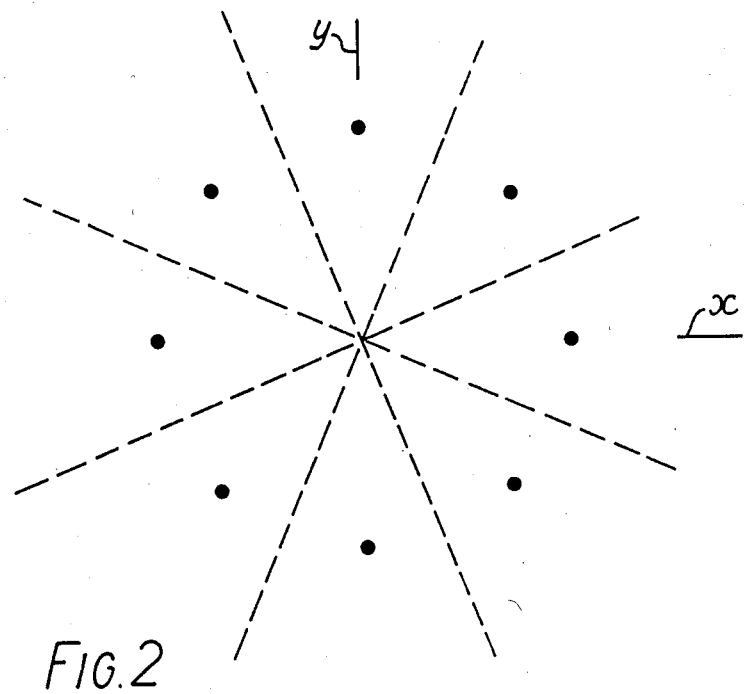
Figure 3:
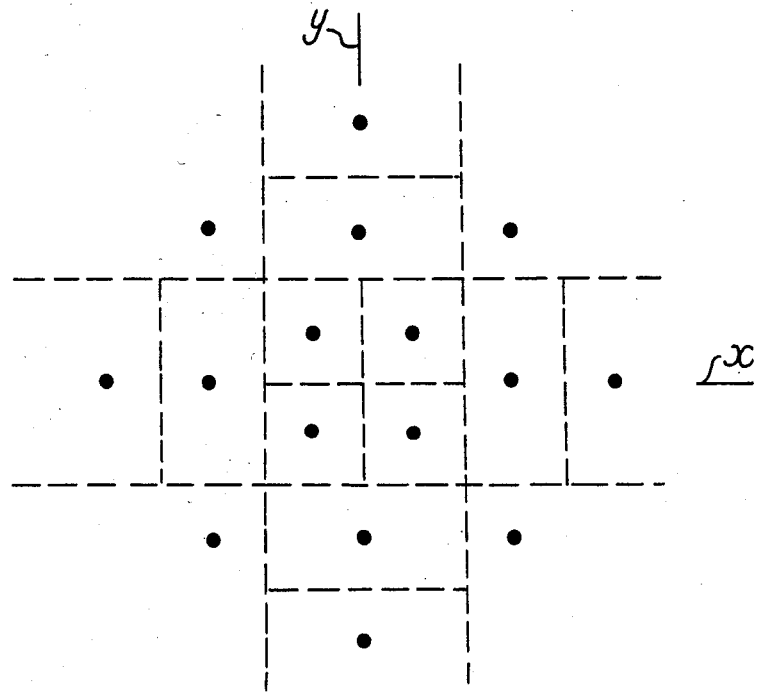
Figure 4:
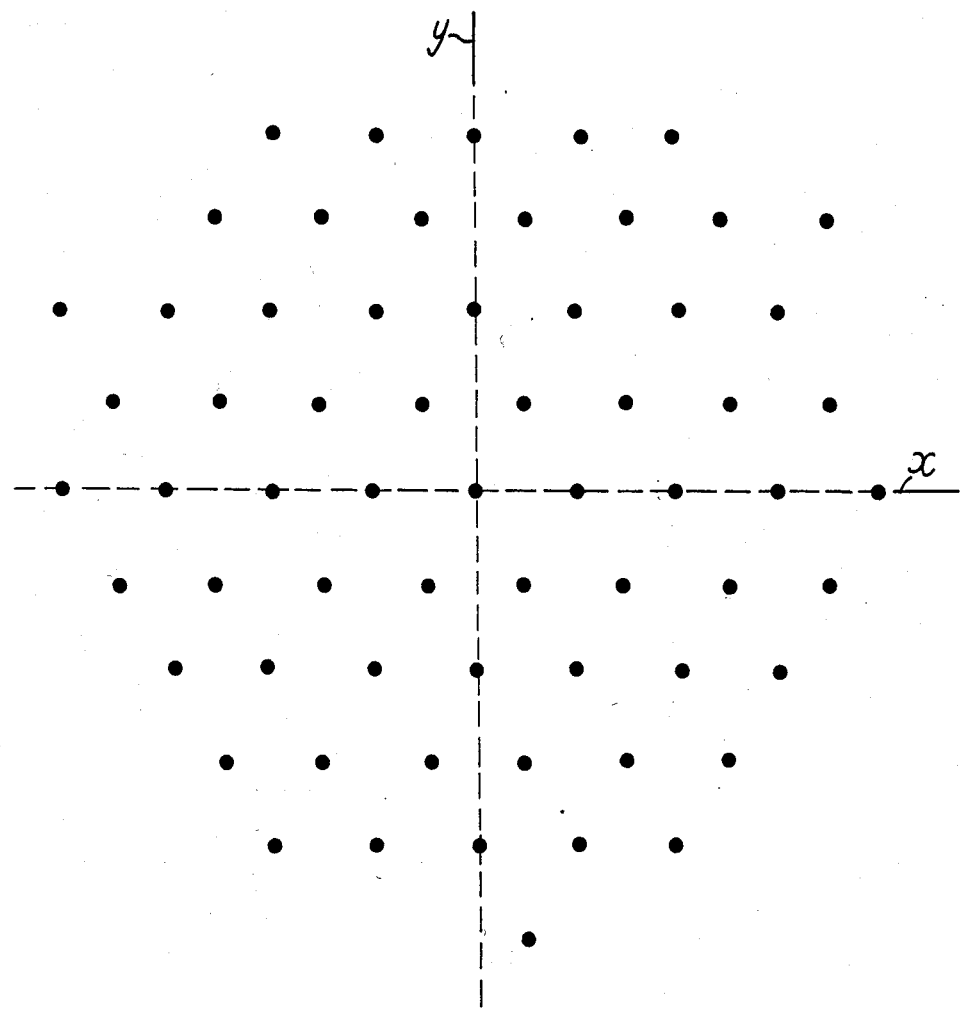
Figure 5:
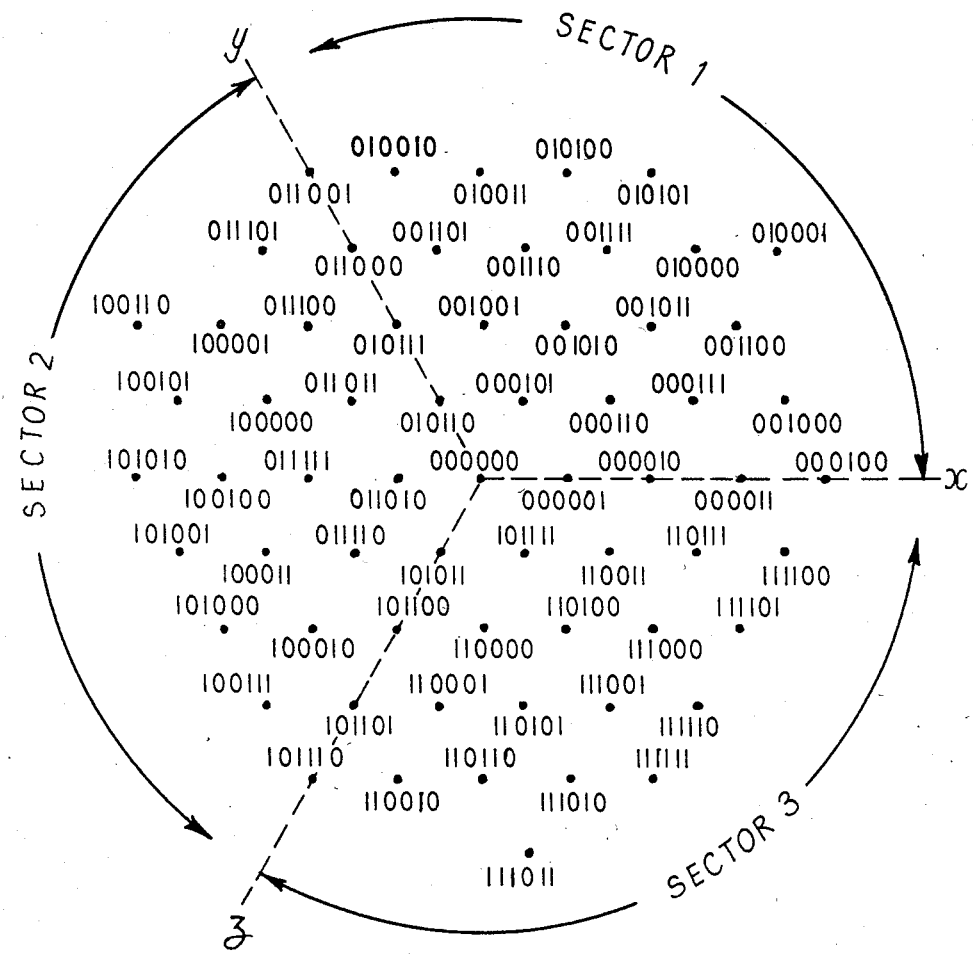
FIG. 5 is an absolute phasor diagram of the symbols produced in a first embodiment of the invention.

Referring to the phasor diagram of FIG. 5, this relates to the case where n is even and equal to 6 whereby 64 symbols are required. The 64 symbols shown, including the centre symbol, are all equally spaced from their immediate neighbours. Three axes at 120° to each other, are shown at x, y and z and these define three sectors marked Sector 1, Sector 2 and Sector 3. Each sector includes the symbols on its clockwise boundary i.e. on the x-axis in the case of Sector 1. In each sector there are 21 symbols making 63 ($=2^n-1$) in all and the 64th symbol is the centre symbol of zero amplitude. The symbols in the three sectors are arranged in like groups i.e. if the symbols of Sector 1 are rotated anti-clockwise by 120° they coincide with the symbols in Sector 2 and if the symbols in Sectors 2 and 3 are rotated anti-clockwise by 120° they coincide with the symbols in Sectors 3 and 1 respectively. The same conditions apply if the symbols are rotated clockwise instead of anti-clockwise.

For convenience of explanation 6-bit data words are shown allocated to the 64 symbols in an ascending series from 000000 at the centre point; 000001 to 010101 in the Sector 1; 010110 to 101010 in Sector 2; and 101011 to 111111 in Sector 3. This is an "absolute" allocation i.e. without regard to the differential encoding described later.

Converting from binary to decimal, the symbols represent 0 at the centre; 1 to 21 in Sector 1; 22 to 42 in Sector 2 and 43 to 63 in Sector 3. For each symbol in Sector 1 the decimal value of the corresponding symbol in Sector 2 is obtained by adding 21 to the value of the symbol in Sector 1. For each symbol in Sector 2 the decimal value of the corresponding symbol in Sector 3 is obtained by adding 21 to the value of the symbol in Sector 2. For each symbol in Sector 3 the decimal value of the corresponding symbol in Sector 1 is obtained by adding 21 to the value of the symbol in Sector 3 and subtracting 63.

Considering now the generation of the symbols in the different sectors it is to be noted that if a carrier-wave x $\cos \omega_c t$ is added to a carrier-wave y $\cos(\omega_c t + 120°)$ any one of the 21 symbols in Sector 1 is produced by appropriate selection of the x and y values. 5 different values of x and 5 different values of y are required.

Likewise, if a carrier-wave y $\cos(\omega_c t + 120°)$ is added to a carrier-wave z $\cos(\omega_c t + 240°)$ any one of the symbols in Sector 2 is produced by appropriate selection of the y and z values. 5 different values of y and 5 different values of z are required which equal the 5 different values of x and y respectively for Sector 1. Similarly, if a carrier-wave z $\cos(\omega_c t + 240°)$ is added to a carrier-wave x $\cos \omega_c t$ any one of the symbols in Sector 3 is produced by appropriate selection of the z and x values. 5 different values of z and 5 different values of x are required which equal the 5 different values of x and y respectively for Sector 1.

Thus corresponding symbols in the three sectors are defined by a pair of x and y values and a sector number. In other words the symbol is defined with reference to Sector 1 together with a rotation of 0°, 120° or 240°. This feature is exploited in the encoding and decoding techniques used in the example now to be described.

Figure 6:
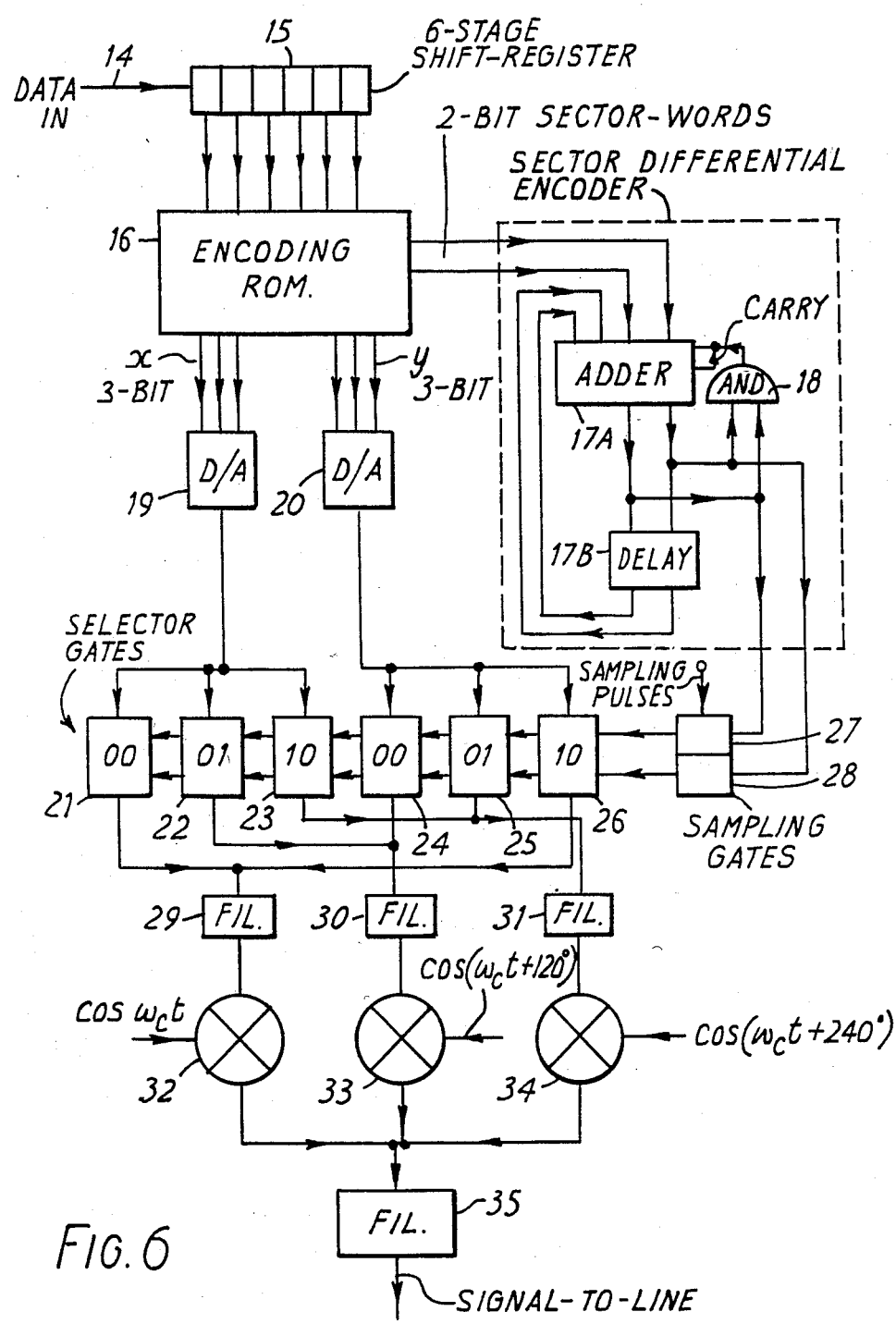
FIG. 6 is a block circuit diagram of apparatus whereby symbols as shown in FIG. 5 can be provided with differential encoding with respect to the 120°-phase-sectors of FIG. 5.

Referring to FIG. 6, binary data at a bit-rate of 14,400 BPS is received at an input 14 and applied to a 6-stage shift-register 15 which marshals the data into 6-bit words. A primary encoding ROM 16 is coupled to the shift-register 15 and receives the 6-bit words from it as addresses. No clock pulses are shown in FIG. 6 but their provision and use will be understood by the person skilled in the art.

The outputs from the ROM 16 in response to the 64 possible different data-words from the shift-register 15 are as shown in Table 1. Correlating Table 1 with the bit-allocation shown in FIG. 5, it will be seen that in response to data-words required to produce symbols in corresponding positions related to Sectors 1, 2 and 3 the ROM provides different 2-bit sector-words 00, 01 and 10 respectively but identical x and y-words. For example in response to the data-words 000001 (1), 010110 (22) and 101011 (43) the outputs from the ROM 15 are 001 for x and 000 for y in each case but the sector words are 00, 01 and 10 respectively.

The 2-bit sector-words are applied to a sector differential encoder shown within a broken line and comprising a 2-bit adder 17A with its output connected to a delay device 17B, providing a delay of one baud-period, the output of 17B being applied to the adder for addition to the 2-bit words from the ROM 16. The sector differential encoder is clocked at baud-rate (symbol-rate) i.e. 14,400/6=2400 pulses per second. If the adder produces a carry this is fed into the least significant end of the adder. If the output of the adder is 11 this is detected by an AND-gate 18 which also applies a carry into the least significant end of the adder.

Thus, for example, assuming an initial state of 00 and the sequence of sector-words 00, 01, 10, 10, 10 to be produced in response to a sequence of data-words the outputs of the adder are 00, 01, 00, 10, 01 which indicate that the symbols to be transmitted are to be located in Sectors 1, 2, 1, 3, 2. In this way the sector-words are differentially encoded.

The 3-bit x and y-words are applied to digital-to-analogue (D/A) converters 19 and 20 respectively. These are of conventional form and arranged to provide outputs in accordance with the following:

000→0

001→2

010→4

011→6

100→8

101→10

The output of the D/A converter 19 is applied to three selector-gates 21, 22 and 23, and the output of the D/A converter 20 is applied to three selector-gates 24, 25, 26. All the gates 21 to 26 are normally disabled and are enabled selectively in pairs by the outputs from the adder 17A. These are applied to sampling gates 27, 28 fed with sampling pulses at baud-rate and the outputs of the sampling-gates 27, 28 are fed to all of the selector-gates 21 to 26. The sampled sector-words 00, 01 and 10 from the sampling gates enable pairs of the selector-gates, the gates which are enabled in responce to the different sector-words being shown on each gate.

The output voltage-pulses from the gates 21 to 26 are applied through three filters 29, 30 and 31 to three balanced amplitude-modulators 32, 33 and 34 in the manner shown, the outputs of the modulators being added to one another. The modulators 32, 33 and 34 are fed with carrier-waves Cos $\omega_c t$, Cos $(\omega_c t+120°)$ and Cos $(\omega_c t+240°)$ respectively. The purpose of each of the filters 29 to 31 is to provide in known manner, in response to each voltage-pulse applied to it, an output waveform shaped in accordance with a required impulse-response function.

Thus, in operation, samples from the selector-gates 21 and 24 are shaped and applied to amplitude-modulate the carrier-waves Cos $\omega_c t$ and Cos $(\omega_c t+120°)$ respectively and thereby provide symbols for transmission in Sector 1. Similarly, samples from the selector-gates 22 and 25 are shaped and applied to amplitude-modulate the carrier-waves Cos $(\omega_c t+120°)$ and Cos $(\omega_c t+240°)$ respectively and thereby provide symbols for transmission in Sector 2. Likewise, samples from the selector-gates 23 and 26 are shaped and applied to amplitude-modulate the carrier-waves Cos $(\omega_c t+240°)$ and Cos $\omega_c t$ respectively and thereby provide symbols for transmission in Sector 3.

The combined outputs of the three modulators are applied to the line through a further filter 35 which functions in known manner to remove unwanted products of modulation. The frequency of the carrier-waves can be, for example 1700 Hz.

Figure 7:
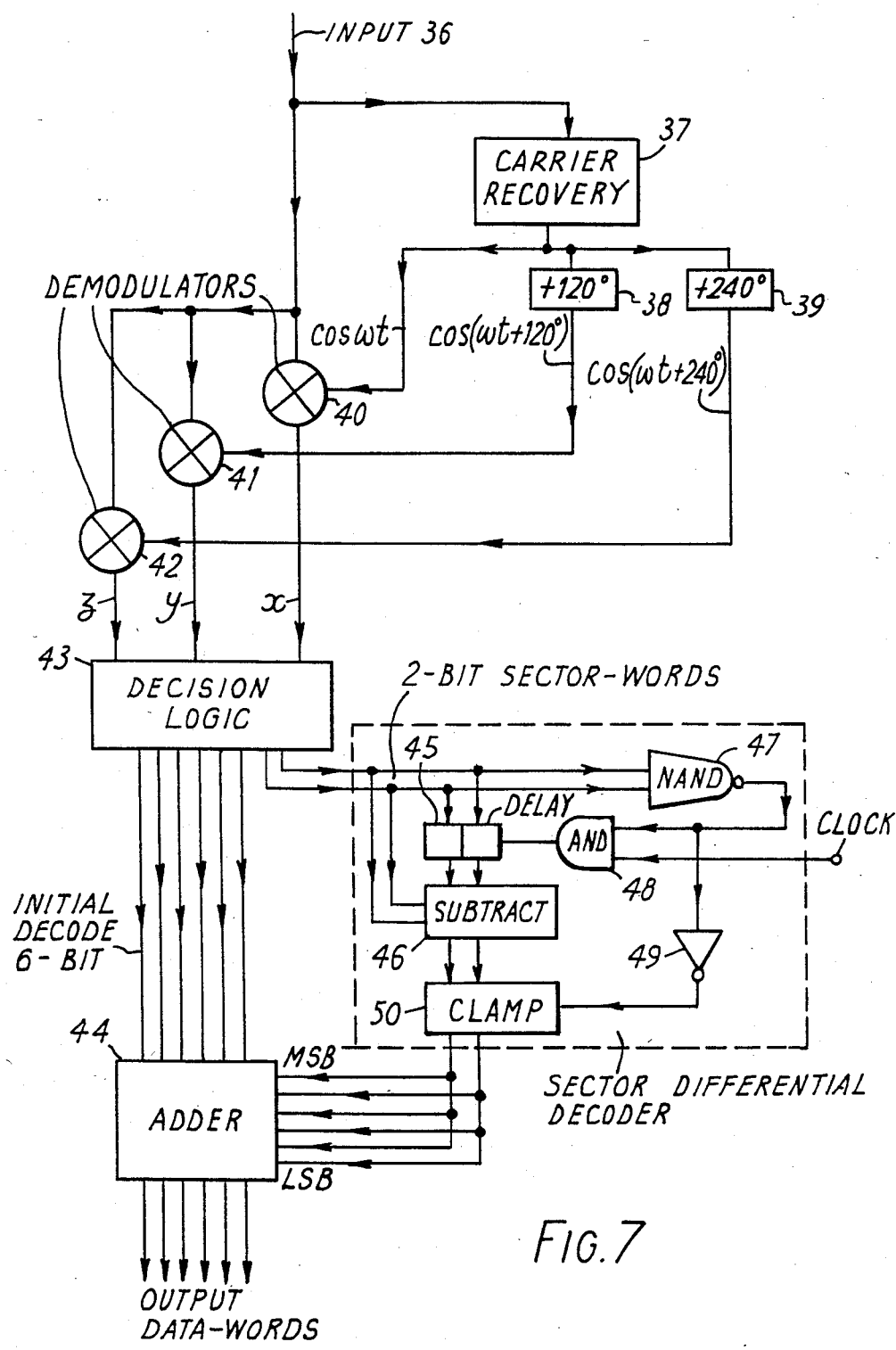
FIG. 7 is a block circuit diagram of apparatus for receiving and decoding symbols produced and transmitted by the apparatus of FIG. 6.

Referring now to FIG. 7 this is a block-diagram of a receiver for receiving and decoding the symbols produced and transmitted by the encoder of FIG. 6. The transmitted symbols are received at an input 36 and applied to a carrier-recovery circuit 37 known per se. The latter provides an output of Cos $\omega_c t$ i.e. a reference wave with the phase of the x-axis in FIG. 5. From this output a phase-shifter 38 provides a second output of Cos $(\omega_c t+120°)$ and another phase-shifter 39 provides a third output of Cos $(\omega_c t+240°)$.

Figure 8:
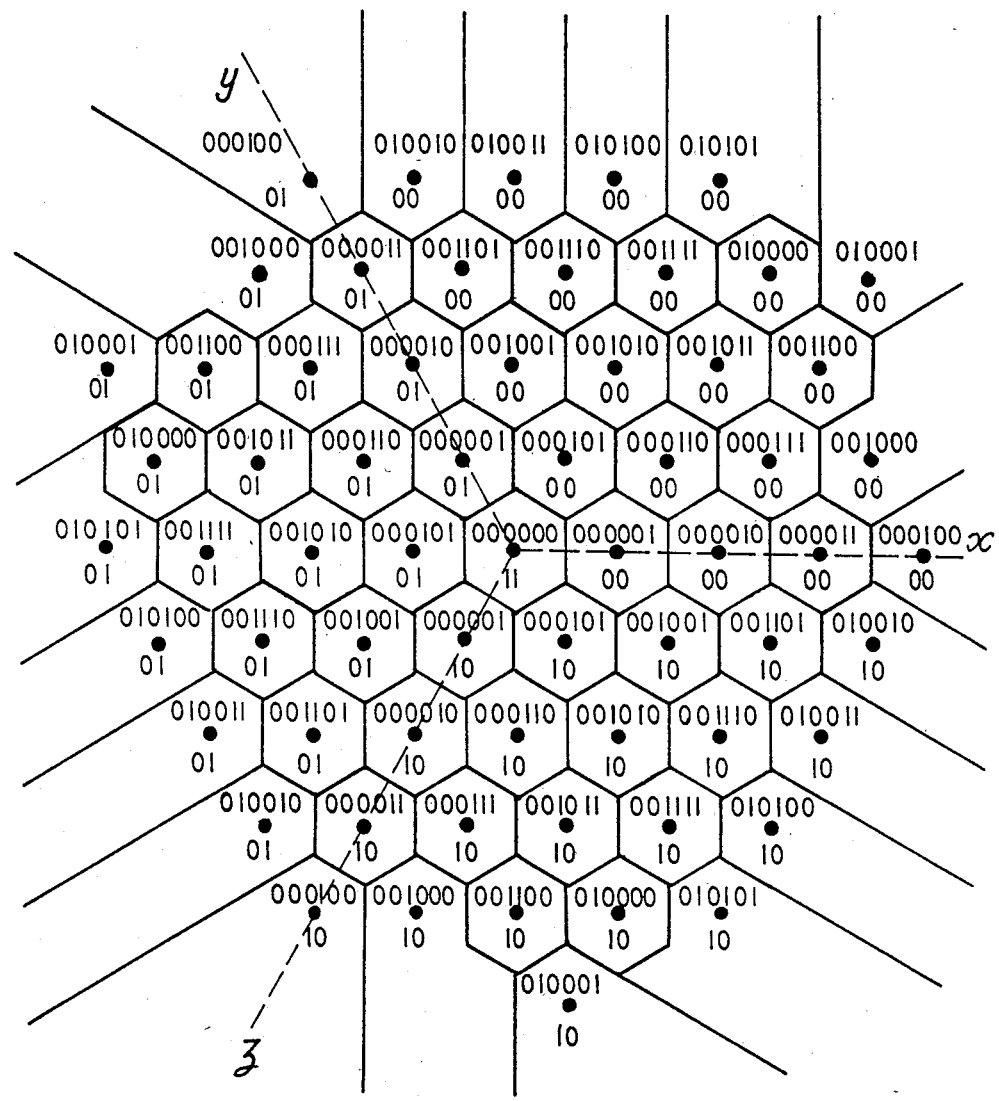
FIG. 8 shows decision-boundaries suitable for incorporation in decision-logic in the circuit of FIG. 7.

The reference waves Cos $\omega_c t$, Cos $(\omega_c t+120°)$ and Cos $(\omega_c t+240°)$ are applied to three synchronous demodulators 40, 41 and 42 respectively. The demodulators are assumed to include samplers and the sampled x, y and z outputs from the demodulators are applied to decision-making logic 43. This operates to provide decision-regions as shown in FIG. 8. From this it will be seen that all decision boundaries are straight lines perpendicular to the x, y and z axes, whereby conventional threshold-logic and associated decoding logic can be used.

The decision-logic 43 provides two outputs, namely an initial 6-bit data-word and a 2-bit sector word. In response to the centre symbol the initial data-word provided is 000000. In response to the 21 symbols in Sector 1 the initial data-words provided are 000001 (1) to 010101 (21) respectively corresponding to the allocations shown in Sector 1 of FIG. 5. In response to the symbols in both Sector 2 and Sector 3 the same initial data-words are provided as for the symbols in Sector 1.

In other words in response to corresponding symbols in the three sectors the same initial data-word is produced as indicated by the six-bit data-words in FIG. 8. Thus Sector 1 is used as a reference sector to which all initial data-words are related.

The initial data-words are applied to an adder 44 and the 2-bit sector-words are applied to a sector differential decoder shown within the broken lines. The differential decoder is arranged to perform the following functions:

(1) Provide an output of 000000 whenever the centre symbol is received, and (2) Provide an output of 000000 (0) or 010101 (21) or 101010 (42) whenever the sector-rotation is 0° or 120° or 240° respectively between the sector containing each non-centre symbol and the sector containing the next preceding non-centre symbol irrespective of whether or not the centre symbol or a succession of them should intervene.

In FIG. 8 the sector-words provided are shown beneath each initial data-word and it will be seen that the sector-words correspond to those used at the transmitter end, but the word 11 is used instead of 00 to indicate the centre symbol.

The differential decoder comprises a delay circuit 45, a subtracting circuit 46, a NAND-gate 47, an AND-circuit 48, an inverter 49 and a digital clamp 50. The delay circuit 45 consists of two bi-stable flip-flops.

In operation the sector-bits are applied to the delay circuit 45, the NAND-gate 47 and the subtracting circuit 46. In the subtracting circuit (which is for detecting the differential sector rotation) the bits of the delayed sector-word are inverted and added to the current sector-word. If a carry should occur this is fed back to the least significant end of the adder. Whenever the output is 11 this is detected by an AND-gate which also feeds a "carry" into the least significant end of the adder. Thus this part of the differential decoder corresponds to the differential encoder coupled with inversion of the delayed bits.

Assuming now the occurrence of any sequence of sector-words excluding 11, the output of the NAND-gate 47 is a '1' throughout whereby the baud-rate clocks pass through the AND-gate 48 and cause the flip-flops in the delay circuit 45 to be clocked at baud rate. Thus the delay provided by the circuit 45 is equal to one baud-period. At the same time no clamping pulse is applied to the clamp 50 whereby the differentially decoded sector-words pass to the adder 44 from the subtracting circuit 46.

The least significant bit from the sector differential decoder is added to the first, third and fifth bits (from the least significant end) of the initial data-word. The most significant bit from the sector differential decoder is added to the second, fourth and sixth bits of the initial data-word.

Thus if the output from the sector differential decoder is 00, indicating Sector 1, the word 000000 is added to the initial data-word. If the output is 01, indicating Sector 2, the word 010101 (21) is added to the initial data-word. If the output is 10, indicating Sector 3, the word 101010 (42) is added to the initial data-word. In this way the original binary data is produced in parallel form ready for parallel-to-serial conversion in the usual way.

Assuming now that the "sector-word" 11 is produced by the logic 43. This causes the NAND-gate to put out a "0" and hence application of clock pulses to the circuit 45 is inhibited. This circuit therefore holds the next preceding sector-word associated with a non-centre symbol. At the same time the inverter 49 inverts the "0" to a "1" and this causes the clamp 50 to clamp the output of the sector differential decoder to 00.

The initial data-word for the centre symbol is 000000 and hence with 000000 added thereto the centre symbol is directly decoded.

This situation holds as long as centre symbols continue to be received and as soon as a non-centre symbol again appears, the sector-word appropriate to that symbol has subtracted from it the sector-word which has been held in the delay circuit 45 by inhibition of the clock pulses.

Considering now the effects of phase-hits, or phase-jumps from whatever reason, which cause the carrier-recovery circuit to lock on the y or z-axis instead of the x-axis, an immediate error occurs but thereafter correct data is recovered. There are three other phases on which the carrier-recovery circuit can tend to lock on the occurrence of a phase-jump namely the negatives of the x, y and z axes. However there are three symbols of amplitudes greater than any of the others namely the symbols which in FIG. 5 are allocated the 6-bit data-words 010001, 100110 and 111011. All are at the same angle of about 36° relative to the x, y and z axes respectively. Thus by providing a detector to detect the occurrence of these symbols the carrier-recovery circuit can be caused to switch the phase of its output by $\pm 60°$ if these symbols should occur at $\pm 60°$ out of phase a given number of times in succession.

In the embodiment described with reference to FIGS. 5 to 8 the minimum required SNR is approximately 15.5 dB. In comparison the minimum required SNR for a rectangular (8×8) disposition of symbols is approximately 16.2 dB. The latter can be reduced slightly but only to about 16.13 dB by moving the four outermost symbols to the co-ordinates $$x = +9, y = +1; x = -1, y = +9;$$

$$x = -9, y = -1; x = +1, y = -9.$$

Thus the embodiment described exhibits a significant reduction in the minimum required SNR.

The embodiment described for the case of n=6 makes use of the centre point and 21 symbols in each of the 120°-phase-sectors but this is not essential. If the centre point is omitted the invention can be applied in the case of n=6 to produce $(2^n+2)$ symbols with 22 symbols in each of the three 120°-phase-sectors as will now be described.

Figure 9:
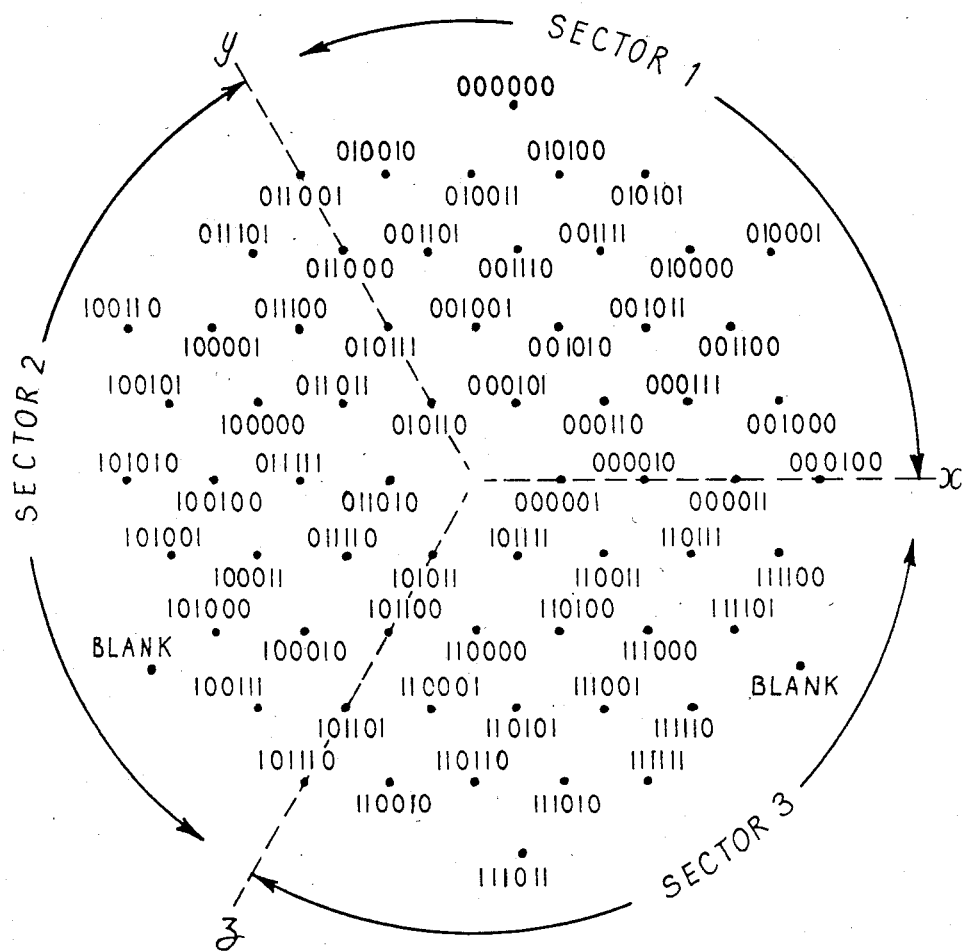
FIG. 9 is an absolute phasor diagram of the symbols produced in a second embodiment of the invention.

In this second embodiment FIG. 5 is modified to the form shown in FIG. 9 from which it will be seen that the centre point is not used and the symbol for 000000 is at x=6 and y=10. The corresponding points in Sectors 2 and 3 are marked BLANK in the absolute diagram of FIG. 9 but are used in the differential encoding as described later. Table 1 is changed into the form shown in Table 2.

Subject to the modification to the primary encoding ROM 16 as shown by Table 2 FIG. 6 remains unchanged.

The manner in which the symbols marked BLANK in FIG. 9 are used will readily be understood from an example.

Assume the sequence of data-words:

000000

010110

000000

These produce the following sequence of words from the ROM 16:

| Sector word | x-word | y-word |
| --- | --- | --- |
| 00 | 011 | 101 |
| 01 | 001 | 000 |
| 00 | 011 | 101 |

Differential-encoding of the Sector-words produces the sequence:

00, 01, 01.

Thus on the second occurrence of the data-word 000000 the symbol transmitted is that marked BLANK in Sector 2. Thus if the current symbol is any symbol in Sector 2 and the next data-word is 000000 the symbol transmitted is that marked BLANK in Sector 2.

Similarly if the current symbol is any symbol in Sector 3 and the next data-word is 000000 the symbol transmitted is that marked BLANK in Sector 3 and so on.

Figure 10:
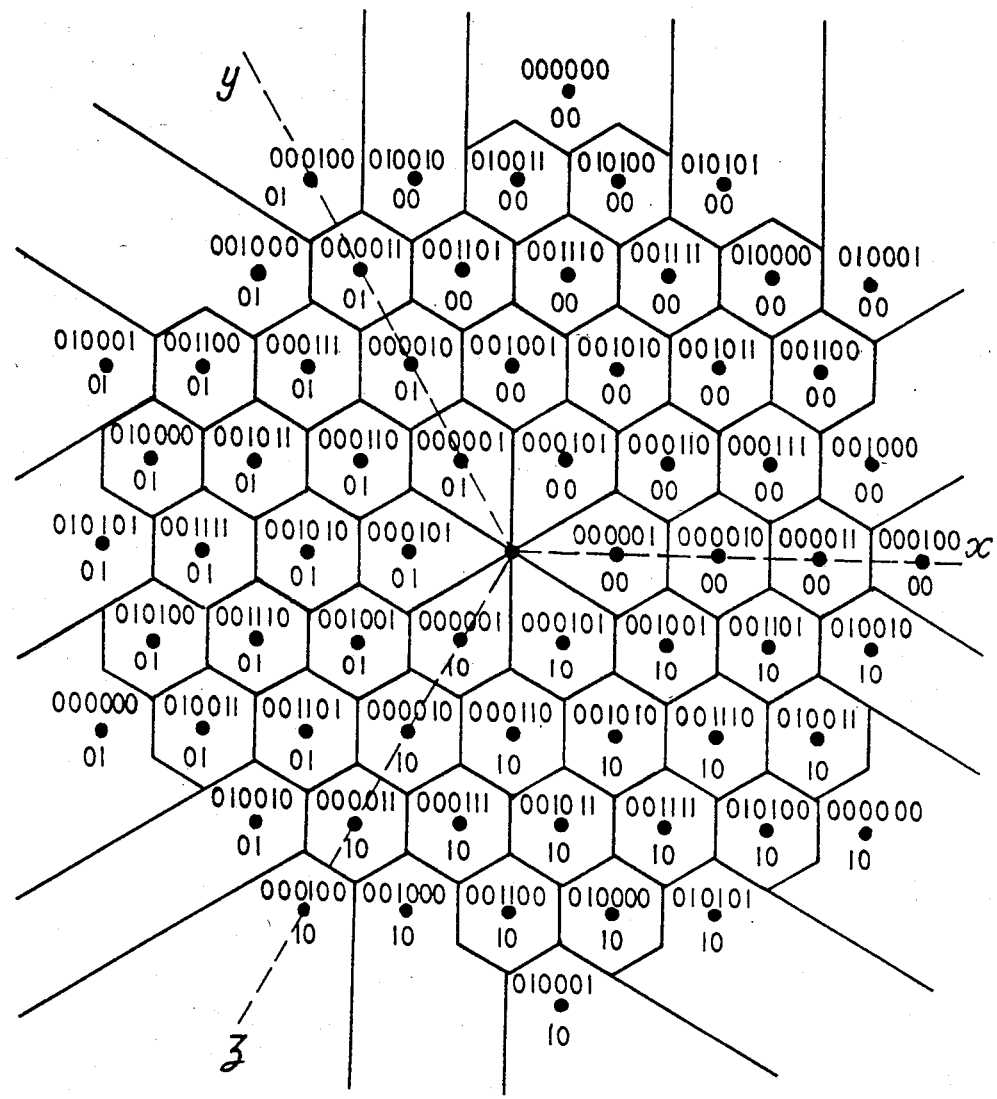
FIG. 10 shows decision-boundaries suitable for incorporation in decision-logic for use in decoding the symbols of the second embodiment.

Referring now to a receiver for receiving the symbols provided and transmitted by the transmitter of this embodiment the block diagram can be as shown in FIG. 7 but with the decision boundaries for the logic 43 modified to the form shown in FIG. 10. It will be seen from FIG. 10 that the "sector-word" 11 is no longer provided and that the sector words 00, 01 and 10 are allocated to the symbols marked 000000 in Sectors 1, 2 and 3 respectively. Thus the NAND-gate 47, AND-gate 48, inverter 49 and clamp 50 can be omitted from FIG. 7.

The operation of the receiver is as already described. The manner in which symbols occupying the points marked BLANK in FIG. 9 are dealt with will be understood by considering the reception and decoding of the sequence described for transmission as follows:

| Symbol No. | Sector No. | x | y | Sector word | Differentially Decoded Sector word | Initial Data word | Add | Output Data |
|---|---|---|---|---|---|---|---|---|
| 1 | 1 | 011 | 101 | 00 | 00 | 000000 | 000000 | 000000 |
| 2 | 2 | 001 | 000 | 01 | 01 | 000001 | 010101 | 010110 |
| 3 | 2 | 011 | 101 | 01 | 00 | 000000 | 000000 | 000000 |

Thus although symbol No. 3 occupies the BLANK in Sector 2 the sector-change from symbol No. 2 is 00 and hence this symbol is correctly decoded as 000000.

In similar fashion a symbol marked BLANK in Sector 3 is correctly decoded as 000000.

Thus when n=6 although there are only 64 possible different data-words, the number of possible different symbols produced is $(2^n+2)=66$. With random (scrambled) data and the differential encoding described, the blank symbols are used in a random fashion and hence the average of the symbols with respect to amplitudes and signs remains at zero.

The minimum required SNR is about 15.8 dB which is lower than in the other prior art forms previously described for the case of n=6.

A third embodiment will now be described in which n is odd and equal to 5. The centre point is not used and the number of symbols is $(2^2+1)=33$ with eleven symbols in each of the three 120°-phase-sectors as shown in the absolute diagram of FIG. 11. It will be seen that in Sector 3 there is one blank symbol as indicated.

FIG. 6 requires only minor modifications for this embodiment. The shift-register 15 has five stages instead of six. The ROM 16 is designed to provide the outputs shown in Table 3 from which it will also be seen that the x and y-words are reduced to 2-bits. Subject to these changes the circuit operates as previously described.

Figure 12:
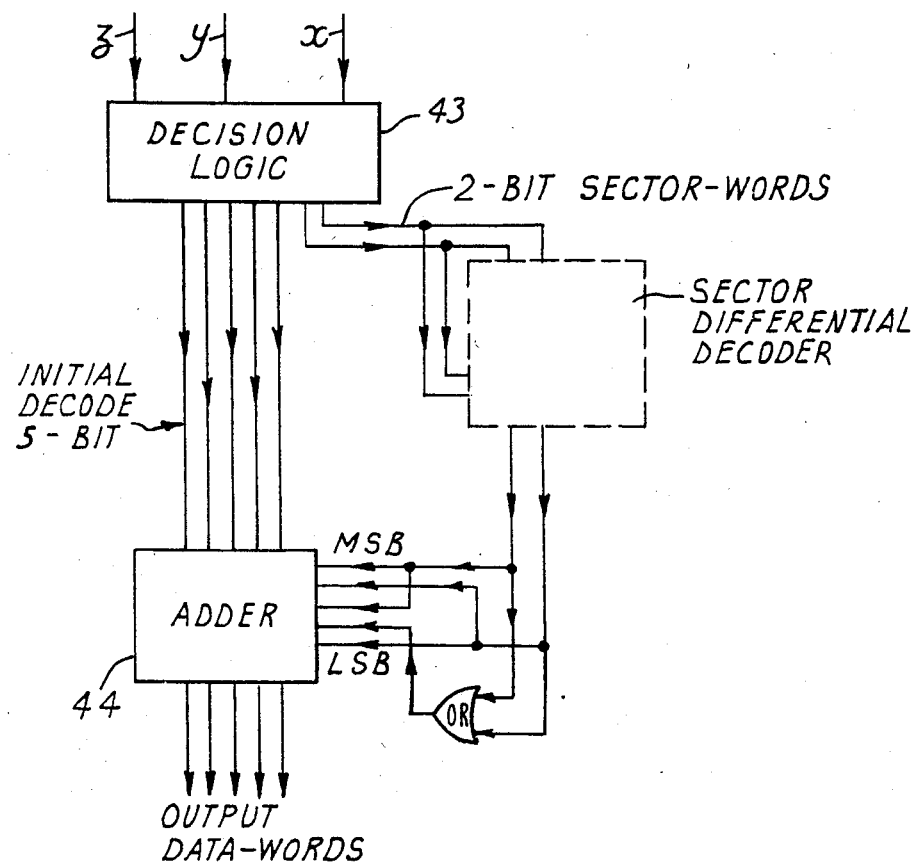
FIG. 12 is a block circuit diagram of a modification to FIG. 7 for use in decoding the symbols of the third embodiment of the invention.
Figure 13:
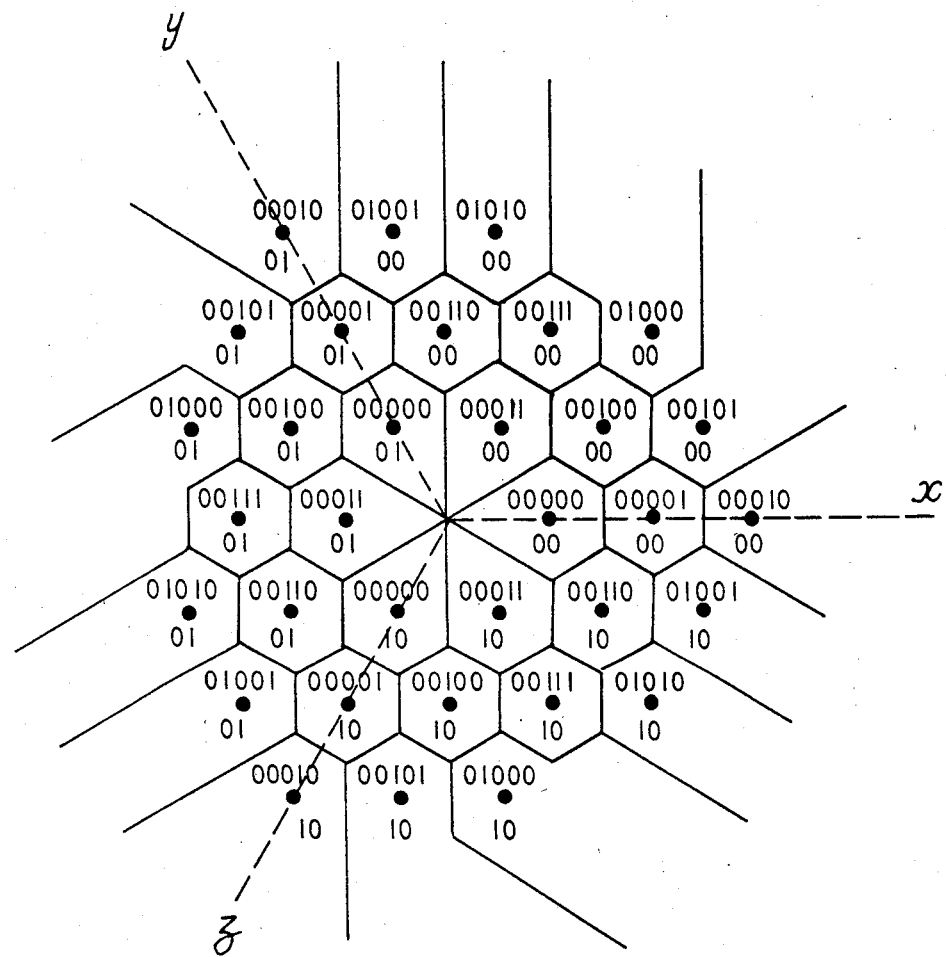
FIG. 13 shows decision-boundaries suitable for incorporation in decision-logic of FIG. 12 for use in decoding the symbols of the third embodiment.

The receiver circuit of FIG. 7 requires modification as shown in FIG. 12. The decision-logic 43 can use decision boundaries as shown in FIG. 13 and provides two outputs of which one is a 5-bit initial data-word related solely to Sector 1 values and the other is a 2-bit sector-word as shown. The sector-words are differentially decoded as previously described with reference to FIG. 7 and the second embodiment and applied to the adder 44 which in this embodiment is a 5-bit adder.

Figure 11:
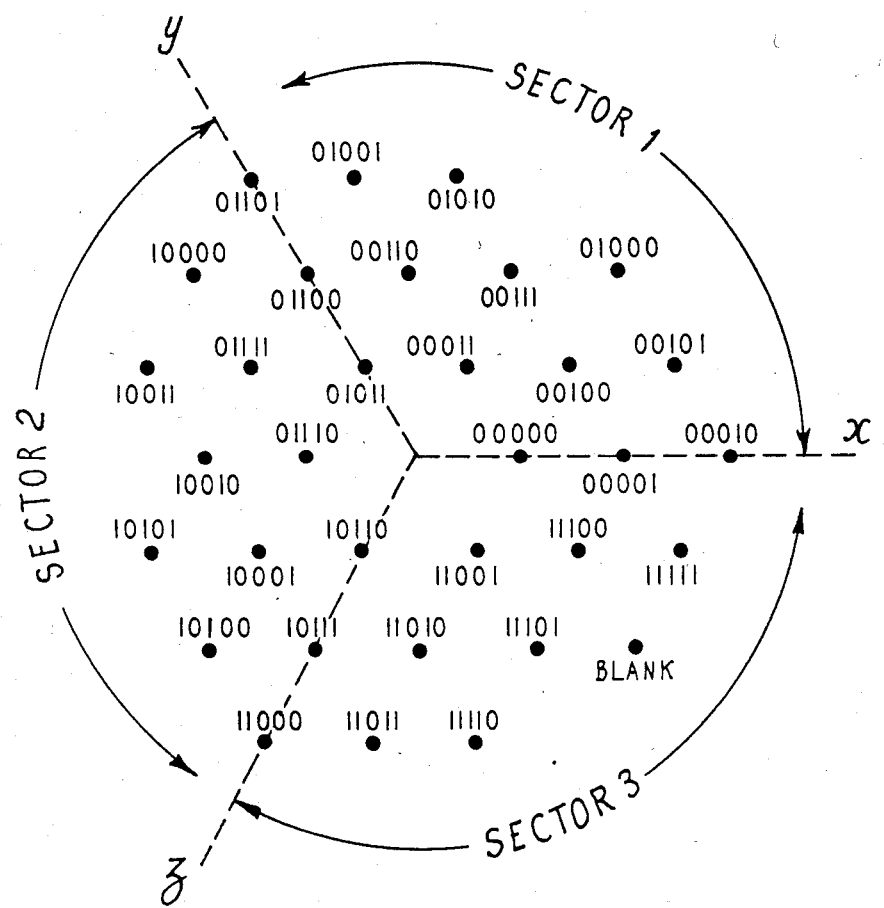
FIG. 11 is an absolute phasor diagram of the symbols provided by a third embodiment of the invention.

As will be seen from FIG. 11 the bit-allocation for each symbol in Sector 2 is derived by adding 01011 (11) to the bits for the corresponding symbol in Sector 1. Likewise the bit-allocation for each symbol in Sector 3 is derived by adding 10110 (22) to the bits for the corresponding symbol in Sector 1.

The circuit in FIG. 12 causes 00000 to be added to the initial data-word in the adder 44 when the output of the sector differential decoder is 00. It causes 01011 (11) to be added when the sector differential decoder output is 01. It causes 10110 (22) to be added when the sector differential decoder output is 10. The minimum required SNR for this embodiment is about 12.85 dB.

Figure 14:
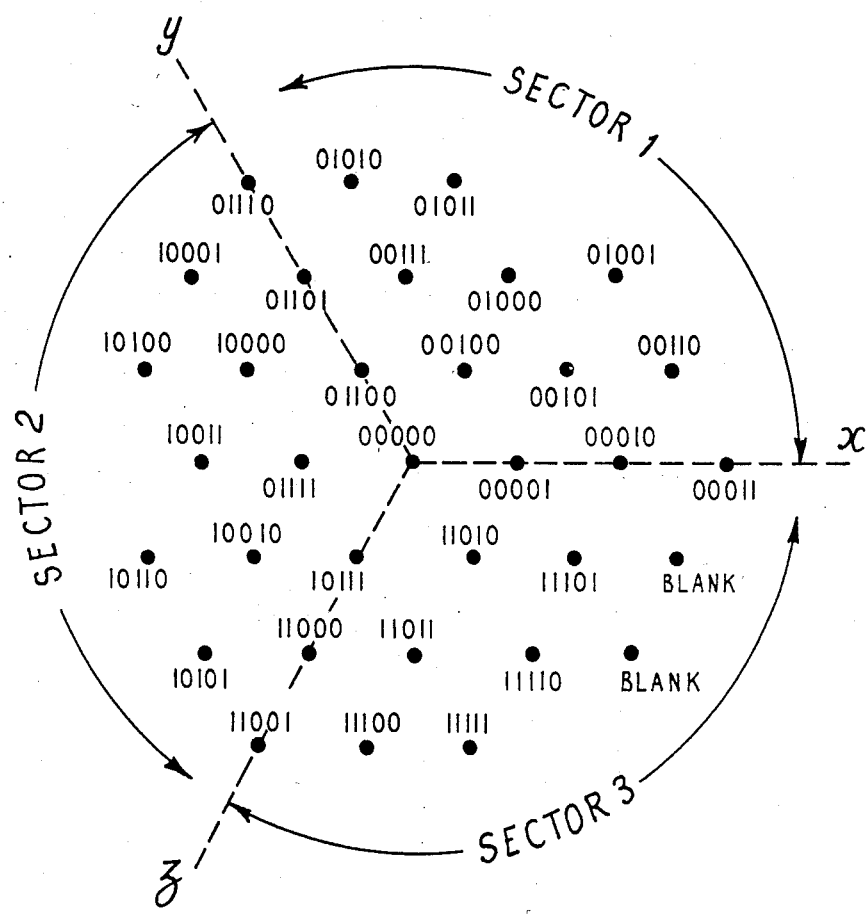
FIG. 14 is an absolute phasor diagram of the symbols provided by a fourth embodiment of the invention.

In a fourth embodiment n is again odd and equal to 5. The centre point is used and there are $(2^n+2)=34$ symbols with eleven symbols in each of the three 120°-phase-sectors. The 34th symbol is the centre point as shown in FIG. 14. The two blank symbols are in Sector 3 as indicated.

The modifications to FIG. 6 are as described for the third embodiment together with a ROM 16 designed to suit the bit allocation of FIG. 14 as shown by Table 4.

Figure 15:
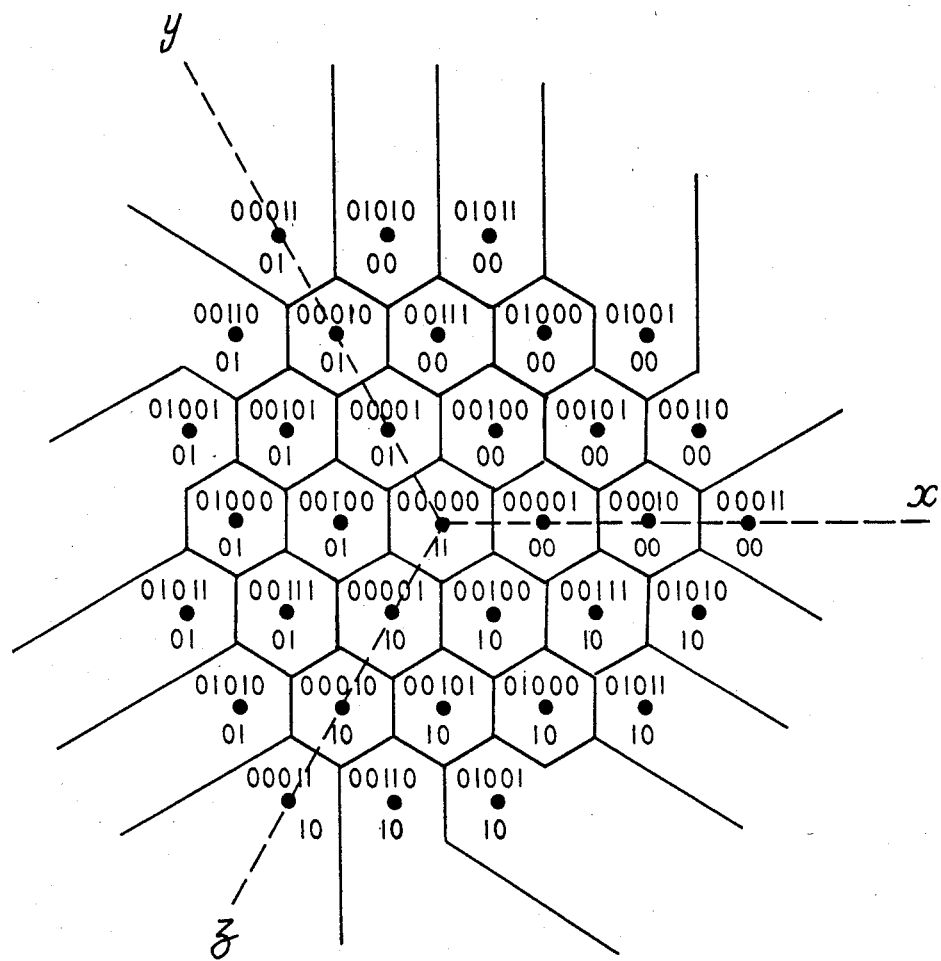
FIG. 15 shows decision-boundaries suitable for incorporation in decision-logic for use in decoding the symbols of FIG. 14.

The receiver is as described with reference to FIG. 12 together with decision boundaries for the decision-logic 43 as shown in FIG. 15 providing the output-words as shown. The sector differential decoder is as shown in FIG. 7 and operates as described with reference to the first embodiment.

Although the absolute diagram of FIG. 14 has two blanks in Sector 3 no unbalance is caused. Arising out of the differential sector-encoding employed each sector is in effect moved in random fashion into the positions occupied by the other two.

For example consider the sequence of data-words:

00001, 10111, 10111, 10111.

The sector-words from the ROM 16 in response to this sequence are:

00, 10, 10, 10

From these the differential encoding produces:

00, 10, 01, 00

Thus the symbols for the run of identical words 10111, 10111, 10111, lie in Sectors 3, 2 and 1 in sequence i.e. Sector 3 appears in relation to FIG. 14 firstly in Sector 3 as shown, then in Sector 2 and finally in Sector 1.

If when in any of these positions the next succeeding word should have been 01010, or 01011 the appropriate one of the blanks would have been filled.

In this embodiment the minimum required SNR is about 12.72 dB. This reduction as compared with the third embodiment arises out of the use of the centre point for one of the symbols.

Figure 16:
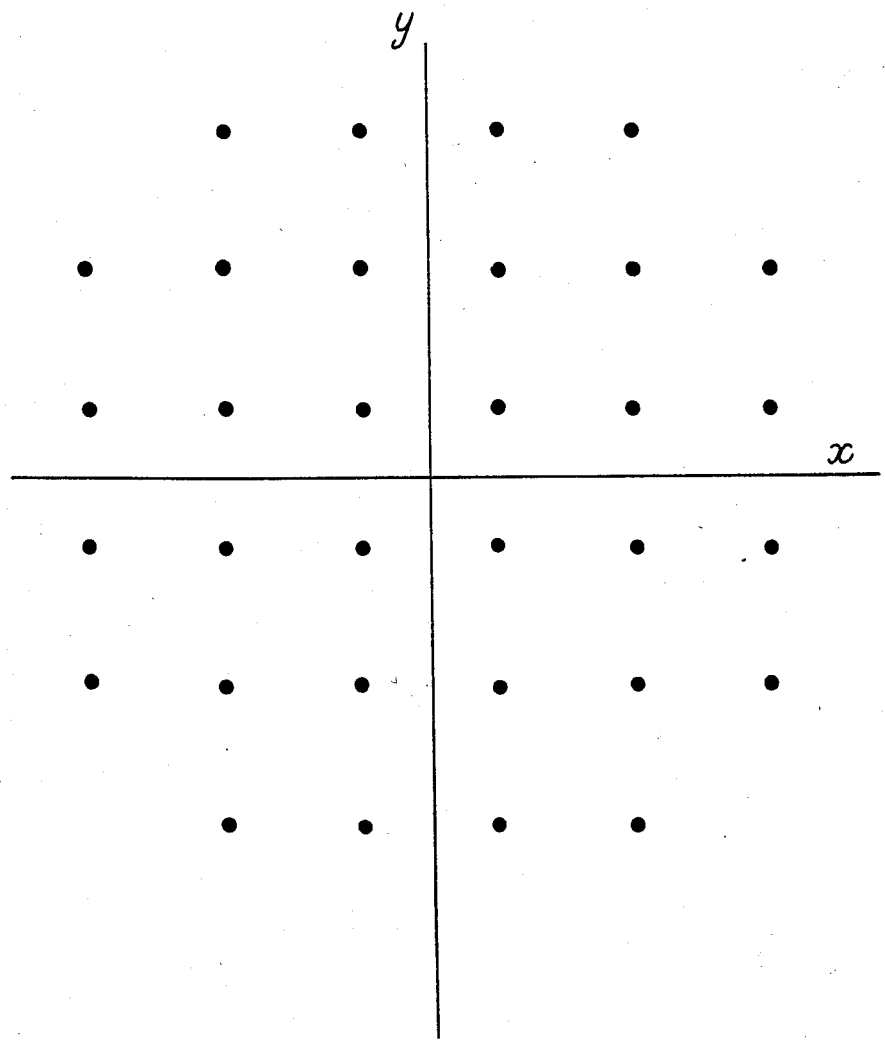
FIG. 16 is a phasor diagram of a known arrangement of 32 symbols.

Comparing the third and fourth embodiments with the known form of FIG. 16, the latter requires a minimum SNR of 13 dB and hence an improvement is again obtained.

The invention is particularly advantageous when applied to the provision of symbols which, when displayed as points in a phasor-diagram, lie at the intersections of three sets of parallel lines each including a respective one of x, y and z 120°-axes, the spacings between adjacent parallel lines in all these sets being equal and the same, as shown for example in FIGS. 5 and 14; or lie at the intersections of three sets of parallel lines each including a respective one of x, y and z 120°-axes but excluding the origin, the spacings between adjacent parallel lines in all three sets being equal and the same, as shown for example in FIGS. 9 and 11. The invention is nevertheless not limited to such applications.

It will be understood for example that if systems are required for use over channels in which excessive phase-jitter can occur the invention can be applied to provide symbols in the differentially encoded 120°-phase-sectors in which the symbols lie solely along the x, y and z axes. Thus all symbols of the same amplitude are separated by 120°.

Figure 18:
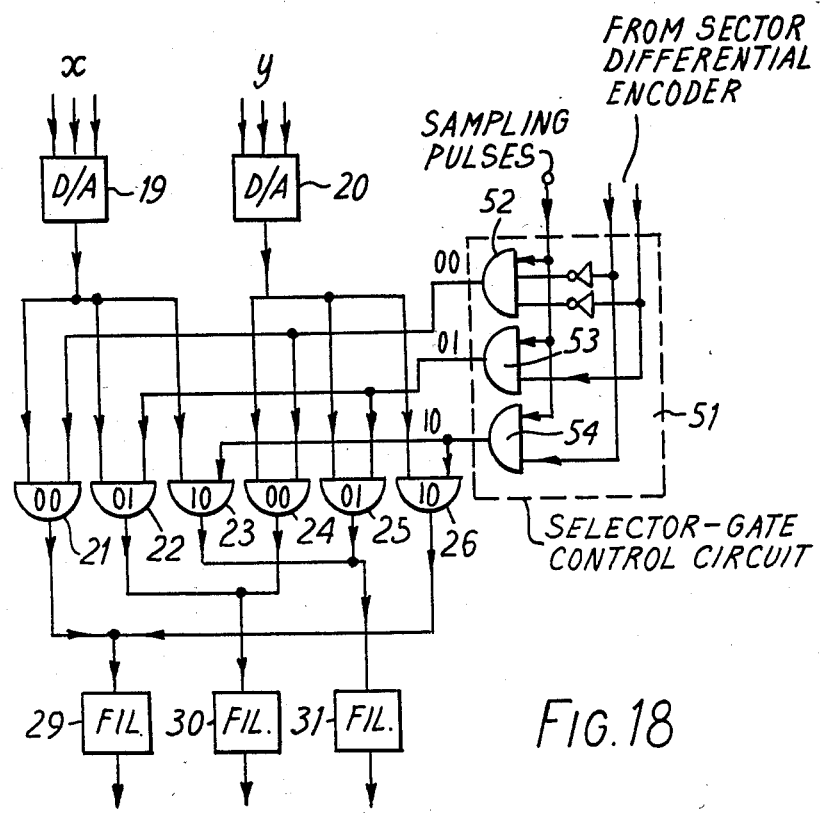
FIG. 18 shows a modification to the arrangement of FIG. 6.
Figure 19:
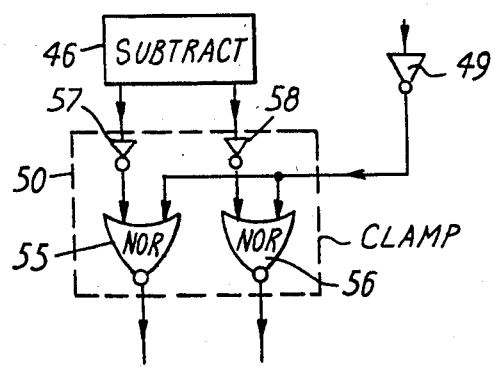
FIG. 19 is a circuit diagram of a clamp in FIG. 7.

An alternative circuit for providing the control pulses for the selector-gates 21 to 26 of FIG. 6 is shown in FIG. 18. In this the differentially-encoded sector-words from the sector differential encoder and the baud-rate sampling pulses are applied to a selector-gate control circuit 51 shown within a broken line—and comprising three AND-GATES 52, 53 and 54. Both bits of the sector-words are inverted and applied to the gate 52. Only the LSB of the sector-words is applied to the gate 53. Only the MSB of the sector-words is applied to the gate 54. The sampling pulses are applied direct to all three of the gates 52 to 54. Thus depending upon whether the differentially encoded sector-word is 00, 01 or 10 a single control-pulse appears at the output of the gate 52, 53 or 54 respectively. The outputs of the gates 52, 53, and 54 are applied to the pairs of selector-gates 21 and 24, 22 and 25, 23 and 26 respectively. The selector-gates 21 to 26 are thereby somewhat simplified at the expense of a somewhat more complicated control circuit 51 in place of the sampling gates 27 and 28 of FIG. 6.

The digital clamp 50 of FIG. 7 can take the form shown in FIG. 18 in which the output of the inverter 49 is applied to the inputs of two NOR-gates 55 and 56. The two outputs of the subtractor 46 are applied to the NOR-gates 55 and 56 through inverters 57 and 58. Thus whenever the output of the inverter 49 is '1' outputs of both NOR-gates are forced to '0'. When the output of the inverter 49 is '0' the outputs of the two NOR-gates repeat the outputs of the subtractor 46.

Alternatively the inverters 49, 57 and 58 can be replaced by direct connections and the NOR-gates 55 and 56 by AND-gates.

For convenience of explanation particular bit-allocations have been used as shown in FIGS. 5, 9, 11 and 14 but other allocations can be employed. In this connection a Gray-code cannot be applied but by suitable allocation the number of bits which are changed on a shift from any one symbol in a sector to any of its immediate neighbours in the sector is limited to either one or two. An example is shown in FIG. 17 which sets out a modification to the bit-allocation for Sector 1 of FIG. 11.

Although the apparatus of FIG. 6 makes use of modulators 32 to 34 in providing the symbols for transmission, modulation need not be employed for this purpose. Digital techniques already in use for other systems can be adapted for putting the present invention into effect.

It will be understood by those skilled in the art that an equaliser will usually be required for incorporation in the receiver and that an adaptive equaliser would probably be preferred. The latter could be of the known complex form in which equalisation is effected with respect to orthogonal axes and cross-products. Following equalisation the x, y and z signals required as inputs to the decision logic 43 are readily provided by an axis-transformation and error-signals from the decoder for application to the equaliser are readily provided again by an axis-transformation.

Although particular embodiments of the invention have been shown and described herein, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

TABLE 1

| Address | Sector word | Address | Sector word | Address | Sector word | x-word | y-word |
|---|---|---|---|---|---|---|---|
| 000001 (1) | 00 | 010110 (22) | 01 | 101011 (43) | 10 | 001 | 000 |
| 000010 (2) | 00 | 010111 (23) | 01 | 101100 (44) | 10 | 010 | 000 |
| 000011 (3) | 00 | 011000 (24) | 01 | 101101 (45) | 10 | 011 | 000 |
| 000100 (4) | 00 | 011001 (25) | 01 | 101110 (46) | 10 | 100 | 000 |
| 000101 (5) | 00 | 011010 (26) | 01 | 101111 (47) | 10 | 001 | 001 |
| 000110 (6) | 00 | 011011 (27) | 01 | 110000 (48) | 10 | 010 | 001 |
| 000111 (7) | 00 | 011100 (28) | 01 | 110001 (49) | 10 | 011 | 001 |
| 001000 (8) | 00 | 011101 (29) | 01 | 110010 (50) | 10 | 100 | 001 |
| 001001 (9) | 00 | 011110 (30) | 01 | 110011 (51) | 10 | 001 | 010 |
| 001010 (10) | 00 | 011111 (31) | 01 | 110100 (52) | 10 | 010 | 010 |
| 001011 (11) | 00 | 100000 (32) | 01 | 110101 (53) | 10 | 011 | 010 |
| 001100 (12) | 00 | 100001 (33) | 01 | 110110 (54) | 10 | 100 | 010 |
| 001101 (13) | 00 | 100010 (34) | 01 | 110111 (55) | 10 | 001 | 011 |
| 001110 (14) | 00 | 100011 (35) | 01 | 111000 (56) | 10 | 010 | 011 |
| 001111 (15) | 00 | 100100 (36) | 01 | 111001 (57) | 10 | 011 | 011 |
| 010000 (16) | 00 | 100101 (37) | 01 | 111010 (58) | 10 | 100 | 011 |
| 010001 (17) | 00 | 100110 (38) | 01 | 111011 (59) | 10 | 101 | 011 |
| 010010 (18) | 00 | 100111 (39) | 01 | 111100 (60) | 10 | 001 | 100 |
| 010011 (19) | 00 | 101000 (40) | 01 | 111101 (61) | 10 | 010 | 100 |
| 010100 (20) | 00 | 101001 (41) | 01 | 111110 (62) | 10 | 011 | 100 |
| 010101 (21) | 00 | 101010 (42) | 01 | 111111 (63) | 10 | 100 | 100 |
| 000000 | 00 | | | | | 000 | 000 |

Key to Sector-words.
00 indicates Sector 1. or centre point
01 indicates Sector 2.
10 indicates Sector 3.

TABLE 2

| Address | Sector word | Address | Sector word | Address | Sector word | x-word | y-word |
|---|---|---|---|---|---|---|---|
| 000000 (0) | 00 | | | | | 011 | 101 |
| 000001 (1) | 00 | 010110 (22) | 01 | 101011 (43) | 10 | 001 | 000 |
| 000010 (2) | 00 | 010111 (23) | 01 | 101100 (44) | 10 | 010 | 000 |

TABLE 2-continued

| Address | Sector word | Address | Sector word | Address | Sector word | x-word | y-word |
|---|---|---|---|---|---|---|---|
| 000011 (3) | 00 | 011000 (24) | 01 | 101101 (45) | 10 | 011 | 000 |
| 000100 (4) | 00 | 011001 (25) | 01 | 101110 (46) | 10 | 100 | 000 |
| 000101 (5) | 00 | 011010 (26) | 01 | 101111 (47) | 10 | 001 | 001 |
| 000110 (6) | 00 | 011011 (27) | 01 | 110000 (48) | 10 | 010 | 001 |
| 000111 (7) | 00 | 011100 (28) | 01 | 110001 (49) | 10 | 011 | 001 |
| 001000 (8) | 00 | 011101 (29) | 01 | 110010 (50) | 10 | 100 | 001 |
| 001001 (9) | 00 | 011110 (30) | 01 | 110011 (51) | 10 | 001 | 010 |
| 001010 (10) | 00 | 011111 (31) | 01 | 110100 (52) | 10 | 010 | 010 |
| 001011 (11) | 00 | 100000 (32) | 01 | 110101 (53) | 10 | 011 | 010 |
| 001100 (12) | 00 | 100001 (33) | 01 | 110110 (54) | 10 | 100 | 010 |
| 001101 (13) | 00 | 100010 (34) | 01 | 110111 (55) | 10 | 001 | 011 |
| 001110 (14) | 00 | 100011 (35) | 01 | 111000 (56) | 10 | 010 | 011 |
| 001111 (15) | 00 | 100100 (36) | 01 | 111001 (57) | 10 | 011 | 011 |
| 010000 (16) | 00 | 100101 (37) | 01 | 111010 (58) | 10 | 100 | 011 |
| 010001 (17) | 00 | 100110 (38) | 01 | 111011 (59) | 10 | 101 | 011 |
| 010010 (18) | 00 | 100111 (39) | 01 | 111100 (60) | 10 | 001 | 100 |
| 010011 (19) | 00 | 101000 (40) | 01 | 111101 (61) | 10 | 010 | 100 |
| 010100 (20) | 00 | 101001 (41) | 01 | 111110 (62) | 10 | 011 | 100 |
| 010101 (21) | 00 | 101010 (42) | 01 | 111111 (63) | 10 | 100 | 100 |

Key to Sector-words.
00 indicates Sector 1.
01 indicates Sector 2.
10 indicates Sector 3.

TABLE 3

| Address | Sector Word | Address | Sector Word | Address | Sector Word | x-word | y-word |
|---|---|---|---|---|---|---|---|
| 00000 (0) | 00 | 01011 (11) | 01 | 10110 (22) | 10 | 01 | 00 |
| 00001 (1) | 00 | 01100 (12) | 01 | 10111 (23) | 10 | 10 | 00 |
| 00010 (2) | 00 | 01101 (13) | 01 | 11000 (24) | 10 | 11 | 00 |
| 00011 (3) | 00 | 01110 (14) | 01 | 11001 (25) | 10 | 01 | 01 |
| 00100 (4) | 00 | 01111 (15) | 01 | 11010 (26) | 10 | 10 | 01 |
| 00101 (5) | 00 | 10000 (16) | 01 | 11011 (27) | 10 | 11 | 01 |
| 00110 (6) | 00 | 10001 (17) | 01 | 11100 (28) | 10 | 01 | 10 |
| 00111 (7) | 00 | 10010 (18) | 01 | 11101 (29) | 10 | 10 | 10 |
| 01000 (8) | 00 | 10011 (19) | 01 | 11110 (30) | 10 | 11 | 10 |
| 01001 (9) | 00 | 10100 (20) | 01 | 11111 (31) | 10 | 01 | 11 |
| 01010 (10) | 00 | 10101 (21) | 01 |  |  | 10 | 11 |

TABLE 4

| Address | Sector Word | Address | Sector Word | Address | Sector Word | x-word | y-word |
|---|---|---|---|---|---|---|---|
| 00001 (1) | 00 | 01100 (12) | 01 | 10111 (23) | 10 | 01 | 00 |
| 00010 (2) | 00 | 01101 (13) | 01 | 11000 (24) | 10 | 10 | 00 |
| 00011 (3) | 00 | 01110 (14) | 01 | 11001 (25) | 10 | 11 | 00 |
| 00100 (4) | 00 | 01111 (15) | 01 | 11010 (26) | 10 | 01 | 01 |
| 00101 (5) | 00 | 10000 (16) | 01 | 11011 (27) | 10 | 10 | 01 |
| 00110 (6) | 00 | 10001 (17) | 01 | 11100 (28) | 10 | 11 | 01 |
| 00111 (7) | 00 | 10010 (18) | 01 | 11101 (29) | 10 | 01 | 10 |
| 01000 (8) | 00 | 10011 (19) | 01 | 11110 (30) | 10 | 10 | 10 |
| 01001 (9) | 00 | 10100 (20) | 01 | 11111 (31) | 10 | 11 | 10 |
| 01010 (10) | 00 | 10101 (21) | 01 |  |  | 01 | 11 |
| 01011 (11) | 00 | 10110 (22) | 01 |  |  | 10 | 11 |
| 00000 (0) | 00 |  |  |  |  | 00 | 00 |

What is claimed is:

1. Apparatus for encoding binary data into symbols for transmission comprising first means for marshalling the data into n-bit data-words where n is plural, and second means coupled to the first means an responsive to at least $(2^n-1)$ different ones of the possible $2^n$ different data-words therefrom to produce symbols arranged in three like groups in three 120°-phase-sectors respectively, the sector in which a symbol is produced being rotated by 0°, 120° or 240° relative to the nextpreceding sector in which a symbol was produced depending upon which of the said at least $(2^n-1)$ data-words is to be transmitted, and a differential encoder for differentially encoding said symbols.

2. Apparatus for encoding binary data into symbols for transmission comprising first means for marshalling the data into n-bit data-words where n is even, and second means coupled to the first means and responsive to $(2^n-1)$ different ones of the possible $2^n$ different data-words therefrom to produce $(2^n-1)$ symbols arranged in three like groups in three 120°-phase-sectors respectively, the sector in which a symbol is produced being rotated by 0°, 120° or 240° relative to the next preceding sector in which a symbol was produced depending upon which of the said $(2^n-1)$ data-words is to be transmitted, the second means being further responsive to the remaining one of the data-words to produce a symbol of zero amplitude; said symbols, when displayed as points in a phasor-diagram, lie at the intersections of three coplaner sets of lines, the lines in each set being parallel and including a respective one of x, y and z 120°-axes so that the parallel lines in each said set are at a 120° angle with the parallel lines in each other said set, the spacings between adjacent parallel lines in all three sets being equal and the same; wherein the second means comprises a read-only-memory (ROM) coupled to the first means and responsive to each of the said $(2^n-1)$ n-bit data-words to provide three output-words of which two represent symbol-co-ordinates with respect to a reference 120°-phase-sector and of which the third is an absolute sector-word; a differential encoder coupled to receive a differentially encode successive absolute sector-words, the ROM also being responsive to the said remaining one of the data-words to provide symbol co-ordinate words of zero magnitude; and means responsive to the symbol coordinate words and the differentially encoded sector-words to provide the symbols for transmission.

3. Apparatus for encoding binary data into symbols for transmission comprising first means for marshalling the data into n-bit data-words where n is even, and second means coupled to the first means and responsive to $(2^n-1)$ different ones of the possible $2^n$ different data-words therefrom to produce $(2^n1)$ symbols arranged in three like groups in three 120°-phase-sectors respectively, the sector in which a symbol is produced being rotated by 0°, 120° or 240° relative to the next preceding sector in which a symbol was produced depending upon which of the said $(2^n-1)$ data-words is to be transmitted, the second means being further responsive to the remaining one of the data-words to produce a symbol of zero amplitude; wherein the second means comprises a read-only-memory (ROM) coupled to the first means and responsive to each of the said $(2^n-1)$n-bit data-words to provide three output-words of which two represent symbol-co-ordinates with respect to a reference 120°-phase-sector and of which the third is an absolute sector-word, a differential encoder coupled to receive and differentially encode successive absolute sector-words, the ROM also being responsive to said remaining one of the data-words to provide symbol co-ordinate words of zero magnitude, and means responsive to the symbol co-ordinate words and the differentially encoded sector-words to provide the symbols for transmission.

4. Apparatus for encoding binary data into symbols for transmission comprising first means for marshalling the data into n-bit data-words where n is even, and second means coupled to the first means and responsive to the $2^n$ different ones of the data-words therefrom to produce $(2^n+2)$ symbols arranged in three like groups in three 120°-phase-sectors respectively, the sector in which a symbol is produced being rotated by 0°, 120° or 240° relative to the next-preceding sector in which a symbol was produced depending upon which of the data-words is to be transmitted, and differential encoding means for differentially encoding said symbols.

5. Apparatus according to claim 4, wherein the symbols, when displayed as points in a phasor-diagram lie at the intersections of three coplaner sets of lines, the lines in each said set being parallel and including a respective one of x, y and z 120°-axes but excluding the origin, so that the parallel lines in each said set are at a 120° angle with the parallel lines in each other said set, the spacings between adjacent parallel lines in all three sets being equal and the same.

6. Apparatus according to claim 5, wherein the second means comprise a read-only-memory (ROM) coupled to the first means and responsive to each of the n-bit data-words to provide three output-words of which two represent symbol co-ordinates with respect to a reference 120°-phase-sector and of which the third is an absolute sector-word, said differential encoding means including a differential encoder coupled to receive and differentially encode successive absolute sector-words, and means responsive to the symbol co-ordinate words and the differentially encoded sector-words to provide the symbols for transmission.

7. Apparatus according to claim 4, wherein the second means comprise a read-only-memory (ROM) coupled to the first means and responsive to each of the n-bit data-words to provide three output-words of which two represent symbol co-ordinates with respect to a reference 120°-phase-sector and of which the third is an absolute sector-word, said differential encoding means including a differential encoder coupled to receive and differentially encode successive absolute sector-words and means responsive to the symbol-co-ordinate words and the differentially encoded sector-words to provide the symbols for transmission.

8. Apparatus for encoding binary data into symbols for transmission comprising first means for marshalling the data into n-bit data-words where n is odd and plural, and second means coupled to the first means and responsive to the $2^n$ different ones of the data-words therefrom to produce $(2^n+1)$ symbols arranged in three like groups in three 120°-phase-sectors respectively, the sector in which a symbol is produced being rotated by 0°, 120° or 240° relative to the next-preceding sector in which a symbol was produced depending upon which of the data-words is to be transmitted and means for differentially encoding said symbols, and differential encoding means for differentially encoding said symbols.

9. Apparatus according to claim 8, wherein the symbols, when displayed as points in a phasor-diagram lie at the intersections of three coplaner sets of lines, the lines in each set being parallel and including a respective one of x, y and z 120°-axes but excluding the origin so that the parallel lines in each said set are at a 120° angle with the parallel lines in each other said set, the spacing between adjacent parallel lines in all three sets being equal and the same.

10. Apparatus according to claim 8, wherein the second means comprise a read-only-memory (ROM) coupled to the first means and responsive to each of the n-bit data-words to provide three output-words of which two represent symbol co-ordinates with respect to a reference 120°-phase-sector and of which the third is an absolute sector-word, said differential encoding means including a differential encoder coupled to receive and differentially encode successive absolute sector-words, and means responsive to the symbol co-ordinate words and the differentially encoded sector-words to provide the symbols for transmission.

11. Apparatus for encoding binary data into symbols for transmission comprising first means for marshalling the data into n-bit data-words where n is odd and plural, and second means coupled to the first means and responsive to $(2^n-1)$ different ones of the possible $2^n$ different data-words therefrom to produce $(2^n+1)$ symbols arranged in three like groups in three 120°-phase-sectors respectively, the sector in which a symbol is produced being rotated by 0°, 120° or 240° relative to the next-preceding sector in which a symbol was produced depending upon which of the said $(2^n-1)$ data-words is to be transmitted, the second means being further responsive to the remaining one of the data-words to produce a symbol of zero amplitude, and differential encoding means for differentially encoding certain of said symbols.

12. Apparatus according to claim 11, wherein the synbols, when displayed as points in a phasor-diagram, lie at the intersections of three coplaner sets of lines, the lines in each said set being parallel and including a respective one of x, y and z 120° axes so that the parallel lines in each said set are at a 120° angle with the parallel lines in each other said set, the spacings between adjacent parallel lines in all three sets being equal and the same.

13. Apparatus according to claim 11, wherein the second means comprise a read-only-memory (ROM) coupled to the first means and responsive to each of the said $(2^n-1)$ n-bit data-words to provide three output-words of which two represent symbol co-ordinates with respect to a reference 120°-phase-sector and of which the third is an absolute sector-word, said differential encoding means including a differential encoder coupled to receive and differentially encode successive absolute sector-words, the ROM also being responsive to the said remaining one of the data-words to provide symbol co-ordinate words and the differentially encoded sector-words to provide the symbols for transmission.

14. Apparatus according to any of claims 1 to 13, wherein the data-word-allocation to corresponding symbols in adjacent 120°-phase-sectors is such that the words differ from one another by a binary number representing $(2^n-1)/3$.

15. In a data communication system having a transmitter for encoding binary data into symbols and a receiver for receiving and decoding the symbols provided and transmitted by a transmitter, the improvement which comprises the transmitter having first means for marshalling the data into n-bit data-words where n is plural, and second means coupled to the first means and responsive to at least $(2^n-1)$ different ones of the possible $2^n$ different data-words therefrom to produce symbols arranged in three like groups in three 120°-phase-sectors respectively, the sector in which a symbol is produced being rotated by 0°, 120° or 240° relative to the next-preceding sector in which a symbol was produced depending upon which of the said at least $(2^n-1)$ data-words is to be transmitted, the receiver having differential decoding means responsive to the rotation between the 120°-phase-sector in which a current symbol other than a zero-amplitude symbol is received and the next preceding 120°-phase-sector in which a symbol was received to differentially decode the said current symbol having regard to the said rotation, a zero-amplitude symbol where applicable being decoded absolutely.

16. In a data communication system having a transmitter for encoding binary data into symbols and a receiver for receiving and decoding the symbols provided and transmitted by a transmitter, the improvement which comprises the transmitter having first means for marshalling the data into n-bit data-words where n is plural, and second means coupled to the first means and responsive to at least $(2^n-1)$ different ones of the possible $2^n$ different data-words therefrom to produce symbols arranged in three like groups in three 120°-phase-sectors respectively, the sector in which a symbol is produced being rotated by 0°, 120° or 240° relative to the next-preceding sector in which a symbol was produced depending upon which of the said at least $(2^n-1)$ data-words is to be transmitted, the receiver having means responsive to received symbols for effecting an initial decoding operation to provide two output-words of which one is an initial data-word and the other for all symbols except of zero-amplitude is a sector-word indicating the 120°-phase-sector in which each symbol is received, the different initial data-words derived from different symbols in a sector being the same for all corresponding symbols in the three 120°-phase-sectors and being related to a reference-sector, a differential decoder coupled to receive and differentially decode successive sector-words, and means for adding to each initial data-word a binary number representing 0 for symbols of zero-amplitude where applicable and $$0, (2^n-1)/3 \text{ or } 2[(2^n-1)/3]$$

in dependence upon the sector-word provided by the differential decoder.

* * * * *

UNITED STATES PATENT AND TRADEMARK OFFICE
CERTIFICATE OF CORRECTION

PATENT NO. : 4,562,425
DATED : December 31, 1985
INVENTOR(S) : Turner, et al.

It is certified that error appears in the above-identified patent and that said Letters Patent is hereby corrected as shown below:

Column 2, line 15, "x - component" should read --y-component--;

Column 11, line 30, "$(2^2 + 1) = 33$" should read -- $(2^n + 1) = 33$ --;

Column 19, line 5, "synbols" should read --symbols--.

Signed and Sealed this

Eighteenth Day of March 1986

[SEAL]

Attest:

DONALD J. QUIGG

Attesting Officer

Commissioner of Patents and Trademarks